(12) United States Patent
Righi et al.

(10) Patent No.: US 8,543,260 B2
(45) Date of Patent: Sep. 24, 2013

(54) METHODS AND SYSTEMS FOR EVALUATION OF SIGNAL PROPAGATION ACROSS DISPARATE TIME DOMAINS

(75) Inventors: Luigi P. Righi, Laguna Hills, CA (US); Gregory M. Wellbrook, Long Beach, CA (US); Mark A. Talbot, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 421 days.

(21) Appl. No.: 13/039,416

(22) Filed: Mar. 3, 2011

(65) Prior Publication Data

US 2012/0226389 A1    Sep. 6, 2012

(51) Int. Cl.
*G06F 7/00*    (2006.01)

(52) U.S. Cl.
USPC ................................. 701/3; 455/344; 455/345

(58) Field of Classification Search
USPC ................. 701/1, 36, 3, 11, 14; 455/98, 431, 455/344, 345, 445, 427; 370/501–504
See application file for complete search history.

(56) References Cited

U.S. PATENT DOCUMENTS

| 6,115,656 A * | 9/2000 | Sudolsky ...................... 701/33.4 |
| 7,203,630 B2 * | 4/2007 | Kolb et al. ......................... 703/6 |
| 7,356,336 B2 | 4/2008 | Perez et al. |
| 8,331,888 B2 * | 12/2012 | Halladay et al. ........... 455/187.1 |
| 8,340,067 B2 * | 12/2012 | Buga et al. .................... 370/338 |
| 2002/0093917 A1 | 7/2002 | Knobbe et al. |
| 2008/0049633 A1 | 2/2008 | Edwards et al. |

FOREIGN PATENT DOCUMENTS

EP    0726664 A3    7/1999

OTHER PUBLICATIONS

GB Search Report of Application No. GB1203690.1; Jul. 2, 2012; 5 pages.

* cited by examiner

*Primary Examiner* — Richard Camby
(74) *Attorney, Agent, or Firm* — Armstrong Teasdale LLP

(57) ABSTRACT

A method for correlating, in time, selected events that are memorialized as data within messages transmitted across disparate communications busses is described. The method includes receiving, with a referencing unit, the messages that are transmitted across the disparate communications busses, referencing, with the referencing unit, the content of a first selected received message to a master clock within the referencing unit, referencing, with the referencing unit, the content of a second selected received message to the master clock within the referencing unit, the second selected received message related to the first selected message, the second selected received message occurring on a communications bus disparate from the communications bus upon which the first received message occurred, and providing, based on operation of the master clock, a common time reference for the content of both the first selected received message and the second selected received message.

18 Claims, 6 Drawing Sheets

METHODS AND SYSTEMS FOR EVALUATION OF SIGNAL PROPAGATION ACROSS DISPARATE TIME DOMAINS

BACKGROUND

The field of the disclosure relates generally to determination of signal propagation delay, and more specifically, to methods and systems for evaluation of signal propagation across disparate time domains.

As one relevant example, modern aircraft are configured with a multitude of systems. Many of these systems communicate to one another via communications buses. Certain of these systems receive information and/or data from a first bus, and one of the functions of such a system is to pass the information through to a second bus that is "time independent" from the first bus. Generally, the first system and the second system operate using independent clocking and therefore there is an inherent uncertainty regarding timing of events as indications of the events occurrence is passed from the first bus to the second bus. That is, the timing of the events that resulted in the information and/or data being transmitted onto the first bus generally is not identifiable when the information and/or data is processed by the system and output onto the second bus.

Such systems include, navigation, fuel monitoring, altitude sensors, communications, radar, autopilot, and in the case of military aircraft, various weapons and defense systems to name a very few. Such systems are generally made up of one or more components that operate together as a system and are typically programmed to provide the flight crew with one or more displays that provide status, and allow for flight crew input. As is easily understood, pilots are dependent on the data received on such displays for operation of the aircraft and for other aspects of a mission being performed via the aircraft, such as delivery of a payload and gathering of data.

The various components of such systems are often referred to as "line-replaceable-units" (LRUs). One type of LRU is a highly complex module often incorporating several processors for controlling and/or monitoring one or more components or subassemblies of an aircraft. Other LRUs are simple, such a mechanical device that outputs a signal based on a position of an engine nozzle. Certain LRUs may be provided to monitor and/or control one or more external devices such as an actuator, valve, motor, etc., associated with a particular component or assembly of the aircraft.

The various displays of an aircraft are also considered to be LRUs. Certain systems, for example, a navigation system may include several LRUs one of which is a dedicated display. A multi-function display may display navigation related data, as well as data from other systems, the data being displayed selectable by the pilot. Depending on a configuration of an avionics suite, one or both of the dedicated display and the multi-function display may communicate via one of the afore-mentioned communications buses.

An LRU typically also generates output signals which can be monitored to determine if the LRU and/or the component with which it is associated is not operating properly. In modern aircraft, such LRUs communicate on communications buses, and certain of these LRUs communicate on multiple buses, each bus having a disparate time domain. This situation leads to an inability to precisely determine the timing of events with respect to the second bus since the event timing is first bus dependent. It is easily understood that with the large amounts of data and information that are distributed among the various LRUs, situations may occur when a common timing reference for the multiple buses is desired.

BRIEF DESCRIPTION

In one aspect, a method for correlating, in time, selected events that are memorialized as data within messages transmitted across disparate communications busses is provided. The method includes receiving, with a referencing unit, the messages that are transmitted across the disparate communications busses, referencing, with the referencing unit, the content of a first selected received message to a master clock within the referencing unit, referencing, with the referencing unit, the content of a second selected received message to the master clock within the referencing unit, the second selected received message related to the first selected message, the second selected received message occurring on a communications bus disparate from the communications bus upon which the first received message occurred, and providing, based on operation of the master clock, a common time reference for the content of both the first selected received message and the second selected received message.

In another aspect, an avionics system is provided that includes a plurality of line replaceable units, at least two disparate busses communicatively coupling said plurality of line replaceable units, and a referencing unit communicatively coupled to receive the messages occurring on the at least two disparate busses and includes a master clock. The referencing unit is programmed to reference the content of a first selected received message occurring on a first of the disparate busses to a master clock within the referencing unit, reference the content of a second selected received message to the master clock within the referencing unit, the second selected received message containing a parameter also contained within the first selected received message, the second selected received message occurring on a communications bus disparate from the communications bus upon which the first selected received message occurred, and provide, based on operation of the master clock, a common time reference for occurrence of the parameter in both the first selected received message and the second selected received message.

In still another aspect, a referencing unit is provided that includes a processing device, a master clock coupled to the processing device, and a plurality of receivers communicatively coupled to the processing device and the master clock. The receivers are each operable for communicative coupling to a communications bus, and the referencing unit is programmed to reference the content of a first message received at a first of said receivers from a first communications bus to the master clock, reference the content of a second message received at a second of the receivers from a second communications bus, disparate from the first communications bus, to the master clock, the second message containing a parameter also contained within the first message, and generate a common time reference for occurrence of the parameter in both the first message and the second message.

The features, functions, and advantages that have been discussed can be achieved independently in various embodiments or may be combined in yet other embodiments further details of which can be seen with reference to the following description and drawings.

DETAILED DESCRIPTION

Many of the line replaceable units (LRUs) in a modern aircraft communicate data to one another over one or more communications buses. A suite of LRUs and their supporting components, including multi-function and dedicated displays may be referred to as a system of systems. As indicated, a system of systems can contain multiple communications buses and the communications between the various components (LRUs) over such buses may include thousands of parameters across the various messages that the LRUs provide to one another. As explained above, when information and/or data is passed from one bus to the next, a timing reference with respect to the first bus may be lost, as oftentimes, the two buses are timing independent.

Figure 1:
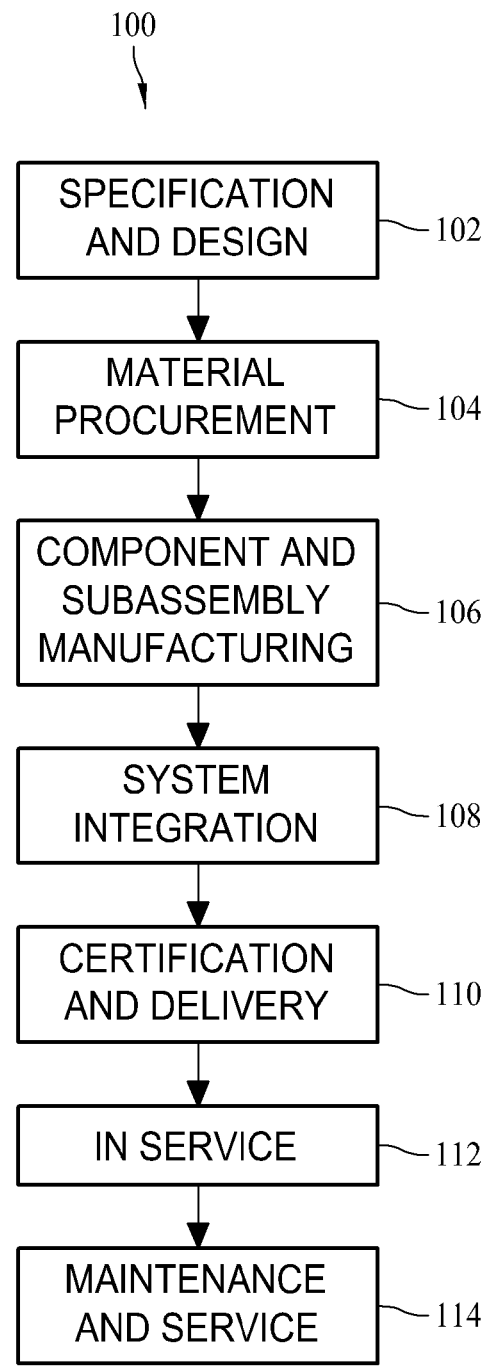
FIG. 1 is a flow diagram of an aircraft production and service methodology.
Figure 2:
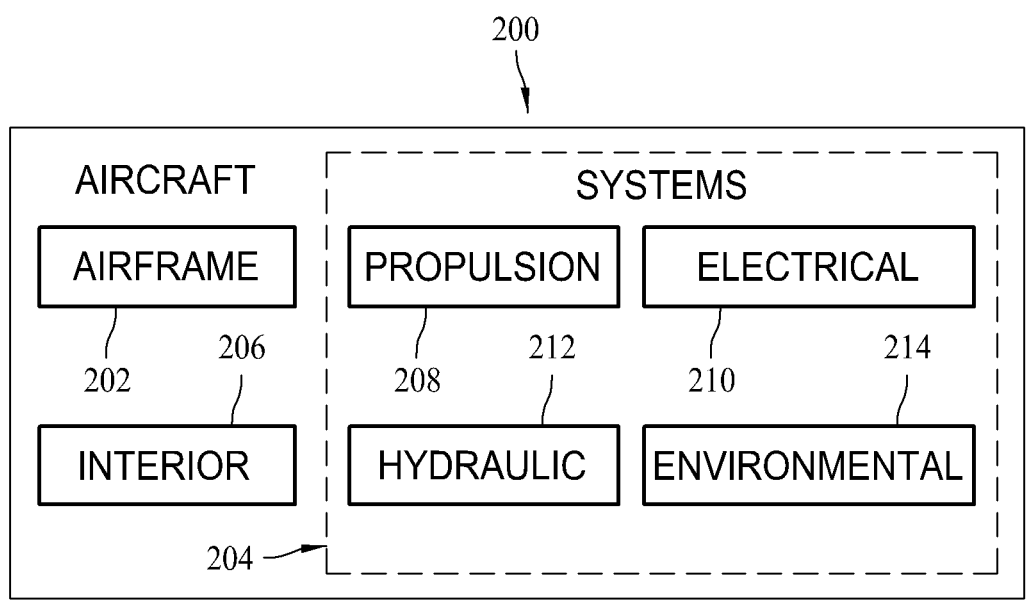
FIG. 2 is a block diagram of an aircraft.

By way of background, and referring more particularly to the drawings, embodiments of the disclosure may be described in the context of aircraft manufacturing and service method 100 as shown in FIG. 1 and an aircraft 200 as shown in FIG. 2. During pre-production, aircraft manufacturing and service method 100 may include specification and design 102 of aircraft 200 and material procurement 104.

During production, component and subassembly manufacturing 106 and system integration 108 of aircraft 200 takes place including the integration of many displays and other LRUs as described herein. Thereafter, aircraft 200 may go through certification and delivery 110 in order to be placed in service 112. While in service by a customer, aircraft 200 is scheduled for routine maintenance and service 114 (which may also include modification, reconfiguration, refurbishment, and so on) which from time to time includes replacement of faulty LRUs.

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on. Any one or multiple of these entities may be responsible for repair and/or replacement of LRUs within the platform.

As shown in FIG. 2, aircraft 200 produced by aircraft manufacturing and service method 100 may include airframe 202 with a plurality of systems 204 and interior 206. Examples of systems 204 include one or more of propulsion system 208, electrical system 210, hydraulic system 212, and environmental system 214. Any number of other systems may be included in this example, and many of these systems are dedicated to a particular function, such as RADAR, and include one or more LRUs that are dedicated to performing the defined functions of the system, including communication of relevant data to other systems resident on a communications bus. Although an aerospace example is shown, the principles of the disclosure may be applied to other industries, such as the automotive industry.

Apparatus and methods embodied herein may be employed during any one or more of the stages of aircraft manufacturing and service method 100. For example, without limitation, components or subassemblies corresponding to component and subassembly manufacturing 106 may be fabricated or manufactured in a manner similar to components or subassemblies produced while aircraft 200 is in service.

Also, one or more apparatus embodiments, method embodiments, or a combination thereof may be utilized during component and subassembly manufacturing 106 and system integration 108, for example, without limitation, by substantially expediting assembly of or reducing the cost of aircraft 200. Similarly, one or more of apparatus embodiments, method embodiments, or a combination thereof may be utilized while aircraft 200 is in service, for example, without limitation, to maintenance and service 114 may be used during system integration 108 and/or maintenance and service 114 to determine whether parts may be connected and/or mated to each other.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

Figure 3:
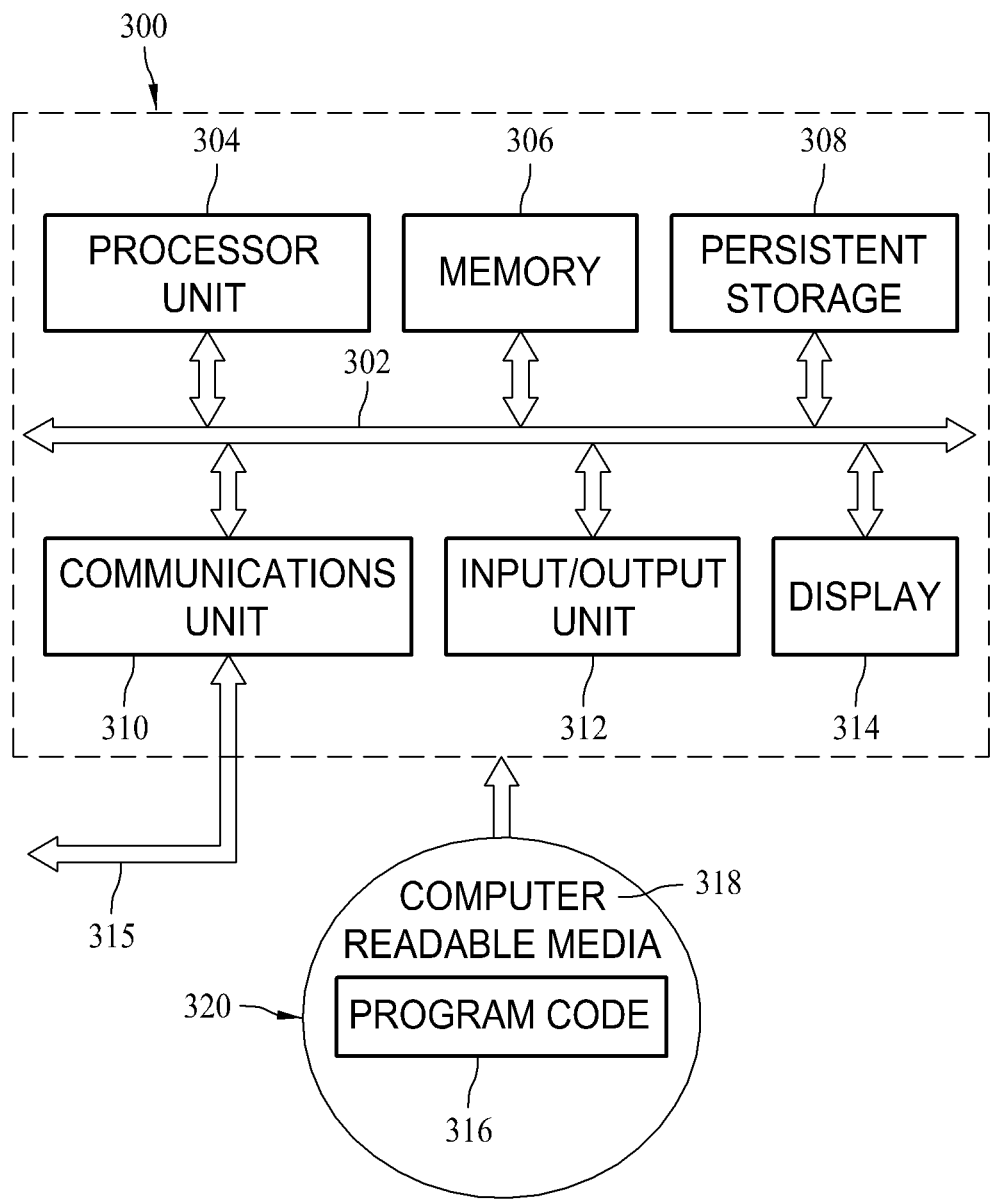
FIG. 3 is a diagram of a data processing system.

Turning now to FIG. 3, a diagram of a data processing system is depicted in accordance with an illustrative embodiment. The data processing system of FIG. 3 is but one example of a data processing system that might be deployed within a display or another LRU. In this illustrative example, data processing system 300 includes communications fabric 302, which provides communications between processor unit 304, memory 306, persistent storage 308, communications unit 310, input/output (I/O) unit 312, and display 314.

processor unit 304 serves to execute instructions for software that may be loaded into memory 306. processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices. A storage device is any piece of hardware that is capable of storing information either on a temporary basis and/or a permanent basis. Memory 306, in these examples, may be, for example, without limitation, a random access memory or any other suitable volatile or non-volatile storage device. persistent storage 308 may take various forms depending on the particular implementation. For example, without limitation, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, without limitation, a removable hard drive may be used for persistent storage 308.

Communications unit 310, in these examples, provides for communications with other data processing systems or devices via an interface to external systems. In the context of the present disclosure, communications unit 310 is an interface to one or more communications buses 315 on an aircraft as described elsewhere herein. Communications unit 310 may provide communications via communications buses 315 through the use of either or both physical and wireless communication links.

Input/output unit 312 allows for input and output of data with other devices that may be connected to data processing system 300. For example, without limitation, input/output unit 312 may provide a connection for user input through a user interface, including, but not limited to, a touch display, a keyboard and mouse. Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306. These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

program code 316 is located in a functional form on computer readable media 318 that is selectively removable and may be loaded onto or transferred to data processing system 300 for execution by processor unit 304. program code 316 and computer readable media 318 form computer program product 320 in these examples. In one example, computer readable media 318 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, computer readable media 318 also may take the form of a persistent storage, such as a hard drive, a thumb drive, or a flash memory that is connected to data processing system 300. The tangible form of computer readable media 318 is also referred to as computer recordable storage media. In some instances, computer readable media 318 may not be removable.

Alternatively, program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

In some illustrative embodiments, program code 316 may be downloaded over communications bus 315 to persistent storage 308 from another device or data processing system for use within data processing system 300. For instance, program code stored in a computer readable storage medium may be downloaded to data processing system 300. The data processing system providing program code 316 may be a server computer, a client computer, or some other device capable of storing and transmitting program code 316.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown.

As one example, a storage device in data processing system 300 is any hardware apparatus that may store data. Memory 306, persistent storage 308 and computer readable media 318 are examples of storage devices in a tangible form.

A bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 306 or a cache such as that found in an interface and memory controller hub that may be present in communications fabric 302.

As mentioned above, the above described data processing system 300 is one example of a system operable for to provide the processing functions for a particular LRU. Now referring to FIG. 4, aircraft 200 includes a number of line-replaceable-units (LRUs) 400 passing data over a number of different avionics buses 402. As explained herein, each LRU 400 can include a module incorporating one or more processors for controlling and/or monitoring one or more components or subassemblies of aircraft 200. For simplicity, LRU 400 refers to any LRU shown in FIG. 4. References to specific LRUs in the following paragraphs utilize different reference numerals. It is understood that certain of the illustrated LRUs may be a LRU providing a display.

In this regard, each LRU 400 of the aircraft can be provided to monitor, control and/or display parameters relating to one or more external devices such as an actuator, valve, motor, etc., associated with a particular component or assembly of the aircraft. In addition, certain LRUs 400 generate output signals, for example, in the form of messages output onto avionics buses 402, which can be monitored to determine if the LRU 400 and/or the component with which it is associated is not properly operating. These LRUs also receive messages from the other LRUs. Specifically, each of the messages contains one or more bits of data that can be reviewed for the purpose of providing information as to the operation of the avionics and/or components coupled thereto.

The aircraft 200 can include any of a number of different LRUs 400 capable of communicating across one or more avionics buses 402. Each avionics bus, and thus the respective LRUs communicating thereon, can be configured to communicate in accordance with any of a number of different standards or protocols. In one typical embodiment, for example, a plurality of avionics buses can be configured in accordance with Mil-Std-1553, entitled: Military Standard Aircraft Internal Time Division Command/Response Multiplex Data Bus (with which its revisions and updates is incorporated by reference herein for all purposes). In such instances, as shown more particularly in FIG. 4, an example aircraft can include four flight control buses 410a-410d, two communication buses 420a, 420b, two mission buses 422a, 422b and a warning and caution system (WACS) bus 424. None, any, or all of the communications buses 402 can be Mil-Std-1553, as other communications bus protocols are known. The example aircraft may incorporate buses in addition to the ones shown in FIG. 4. An example of such a communications bus would be a Mil-Std-1553 bus that provides communications related to displays, for example, communications between a display controller and a display. This document refers to the communications buses 402 as Mil-Std-1553 buses for convenience only, and the disclosure should not be construed as limited to Mil-Std-1553.

Figure 4:
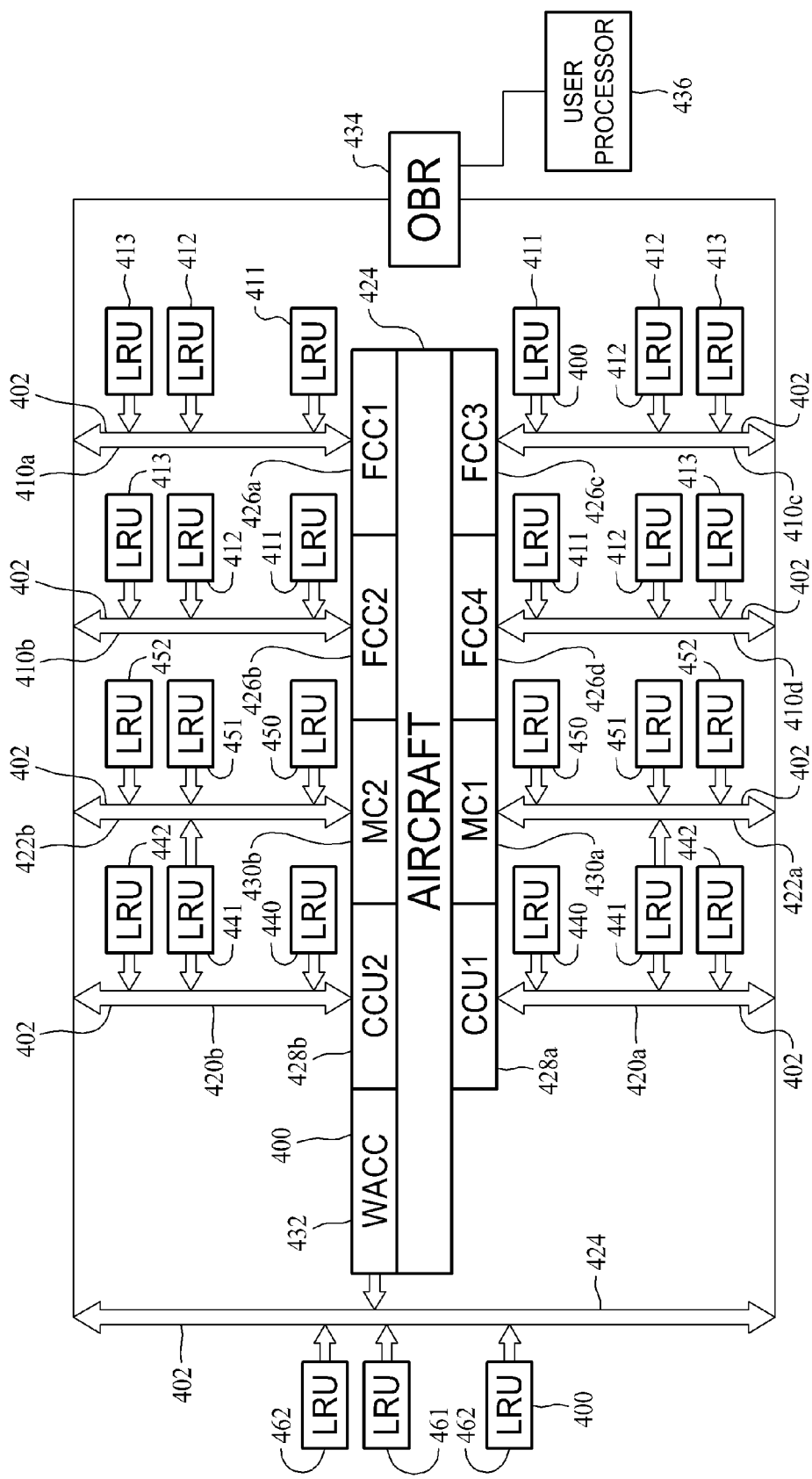
FIG. 4 is a diagram illustrating an aircraft configuration of multiple communications buses providing a communications capability for a multitude of line replaceable units.

Each Mil-Std-1553 bus 410a-410d, 420a, 420b, 422a, 422b, 424 of the aircraft 200, in turn, can include a primary and a secondary channel for transmitting signals between the various LRUs 400 and bus controller of the respective bus. In this regard, each of the LRUs 400 associated with each Mil-Std-1553 bus is considered one or both of a bus controller and a remote terminal. Certain of the LRUs 400 are understood to be operational as displays. A single avionics bus configured in accordance with Mil-Std-1553 may support up to thirty-one separate remote terminals. For example, as shown in FIG. 4, each flight control bus 410a-410d can have an associated flight control computer (FCC) 426a-426d and a number of LRUs 411, 412, 413. Each respective FCC, which is also considered an LRU, then, can control the LRUs associated with a respective flight control bus to thereby control the primary and secondary flight surfaces of the aircraft.

Also, for example, each communication bus 420a, 420b can have an associated communication control unit (CCU) 428a, 428b and a number of LRUs 440, 441, 442. The respective CCU's, which are also considered LRUs, can control the LRUs associated with the respective buses to control functions for the Integrated Radio Management System (IRMS), including radio, intercom and public address (PA) system control. Each mission bus 422a, 422b, for example, can have an associated mission computer (MC) 430a, 430b, often referred to as a core integrated processor (CIP), and considered an LRU. The MCs can control operation of a number of LRUs 450, 451, 452 associated with the respective mission buses to provide control, display and data processing for navigation system modes and sensor management navigation capability. The MCs can also provide four-dimensional (4D) guidance of the aircraft, thrust management and data for aircraft takeoff, landing, missed approach and engine-out conditions. Further, for example, the WACS bus 424 can include an LRU referred to as a warning and caution computer WACC 432 controlling operation of a number of LRUs 460, 461, 462 associated with the WACS bus. In addition, the WACC can convert aircraft status/failure signals for display on a warning annunciator panel (WAP). It is to be understood that the architecture of FIG. 4 is but one example aircraft architecture and that communications buses in addition to or instead of Mil-Std-1553 may be utilized.

To illustrate embodiments, FIG. 4 includes LRUs 441 that are configured to communicate on both the communications busses 420 and the mission buses 422. Such a configuration is to be considered as an example only. In the embodiment, LRU 441 is configured to receive information and/or data from mission bus 422 and pass that information and/or data to communications bus 420. Likewise, LRU 441 may be configured to receive information and/or data from communications bus 420 and pass that information and/or data to mission bus 422. As explained herein, mission bus 422 and communications bus 420 generally do not share the same timing reference and therefore when information and/or data are received from one of the mission bus 422 and the communications bus 420 and output onto the other, the output information generally cannot be definitely referenced to the time associated with the bus upon which the information and/or data passed. Specifically, the second bus that receives the parameter indicative of an event cannot provide a timing reference that is determinative on exactly the parameter was generated.

As explained more fully below, to provide a common time reference to all of the disparate avionics buses 402, the system of one embodiment includes a referencing unit 434 coupled to multiple of the avionics buses 402 described herein. The referencing unit 434 is therefore capable of receiving data output from any or all of the LRUs associated with one or more avionics buses, and thereafter determining relevant timing references between the messages transmitted on the various avionics busses 402. These determined timing references may then be forwarded to a user processor 436 for subsequent presentation, analysis or the like.

In contrast to conventional techniques for testing and monitoring traffic across multiple busses of an aircraft 12, the referencing unit 434 is capable of monitoring the data output from all of the LRUs 400 associated with a greater plurality of avionics buses, such as all of the LRUs associated with the Mil-Std-1553 buses 402, 410a-410d, 420a, 420b, 422a, 422b, 424. Also in contrast to conventional techniques, if so desired, the referencing unit 434 can be configured to identify events, such as timing faults, in the messages output by the respective LRUs 400. The referencing unit 434 can selectively record and analyze data output onto the various busses 402. As such, referencing unit 434 acts as a master clock, operating to tie the bus traffic from disparate avionics busses 402 to a single timing reference. As an example, referencing unit 434 is operable to sync instances of a parameter occurring in the messages of different avionics buses 402 and is therefore operable to determine a true propagation delay across multiple disparate time domains.

Figure 5:
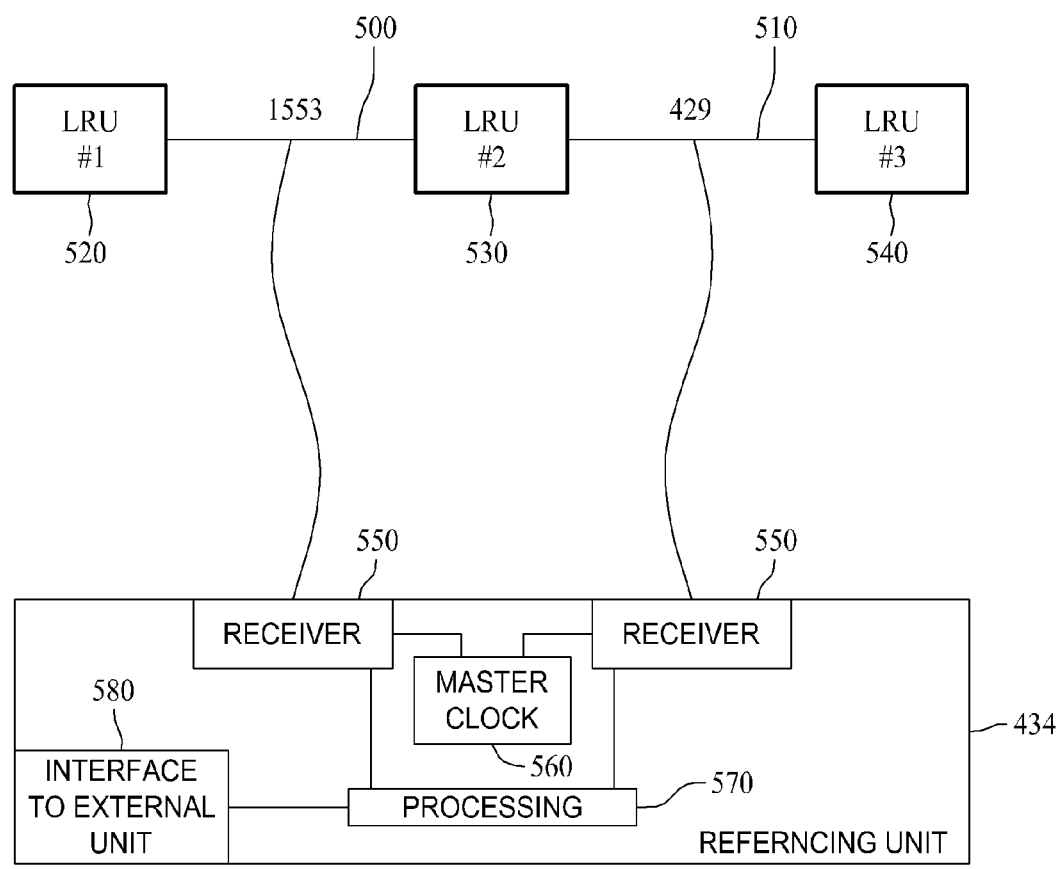
FIG. 5 is an illustration of a referencing unit operable to receive messages from multiple disparate buses.

FIG. 5 provides a further illustration where referencing unit 434 is coupled to both a 1553 bus 500 and an ARINC-429 bus 510. In the example of FIG. 5, LRU1 520 communicates with LRU2 530 across the 1553 bus 500. LRU2 530 communicates with LRU3 540 across the ARINC-429 bus 510. In one possible scenario, LRU1 520 generates, or receives from an external source, data which is then output onto the 1553 bus 500 in a message generated by LRU1 520. The scenario continues with LRU2 530 receiving this message from LRU1 520 and generating a message for output onto the ARINC-429 bus 510 to LRU3 540. The message generated by LRU2 530 for output onto ARINC-429 bus 510 may include the data originating with LRU1 520. As those skilled in the art understand, the timing reference for 1553 bus 500 and the timing reference for the ARINC-429 bus are different, and as such, any timing relevant information originating within LRU1 520 is lost as the message passes through the system shown in FIG. 5.

To provide the described functionality, referencing unit 434 includes a receiver 550 for each disparate bus the referencing unit 434 is to monitor. These receivers 550 are coupled to a master clock 560 and both the receivers and the master cock are coupled to a processing unit 570 which provides, for example, relevant timing of events that occur on the busses 500 and 510 to an external interface 580 for transmission to an end user or another computing device.

In systems like the systems of FIGS. 4 and 5, the delays in data propagation are handled in the design of the components and the communications therebetween and the specifications for such systems end up incorporating the tolerances and variances needed to ensure that such a system is operational. The referencing unit 434 operates to record all data and signal events that occur on the buses 500 and 510. A specific example is an event on bus 500 that can be a message transmission or a pulse on a suppression bus (which is a bus that does not operate in an environment that has a local reference clock), but operation of referencing unit 434 is not limited to operation with suppression buses. FIG. 5 helps to illustrate that as these bus-related events occur, they may transpire across multiple signal transmission mediums (different busses) or in an environment that has no local reference clock. The clock function within referencing unit 434 provides relationship of the overall sequence of events and allows relating these to local clocks across time domains, which in turn allows a specific determination of the overall time span of a series of events. Specific time relationships of events can be determined even if the system has disparate clocks or no clocks at all.

Figure 6:
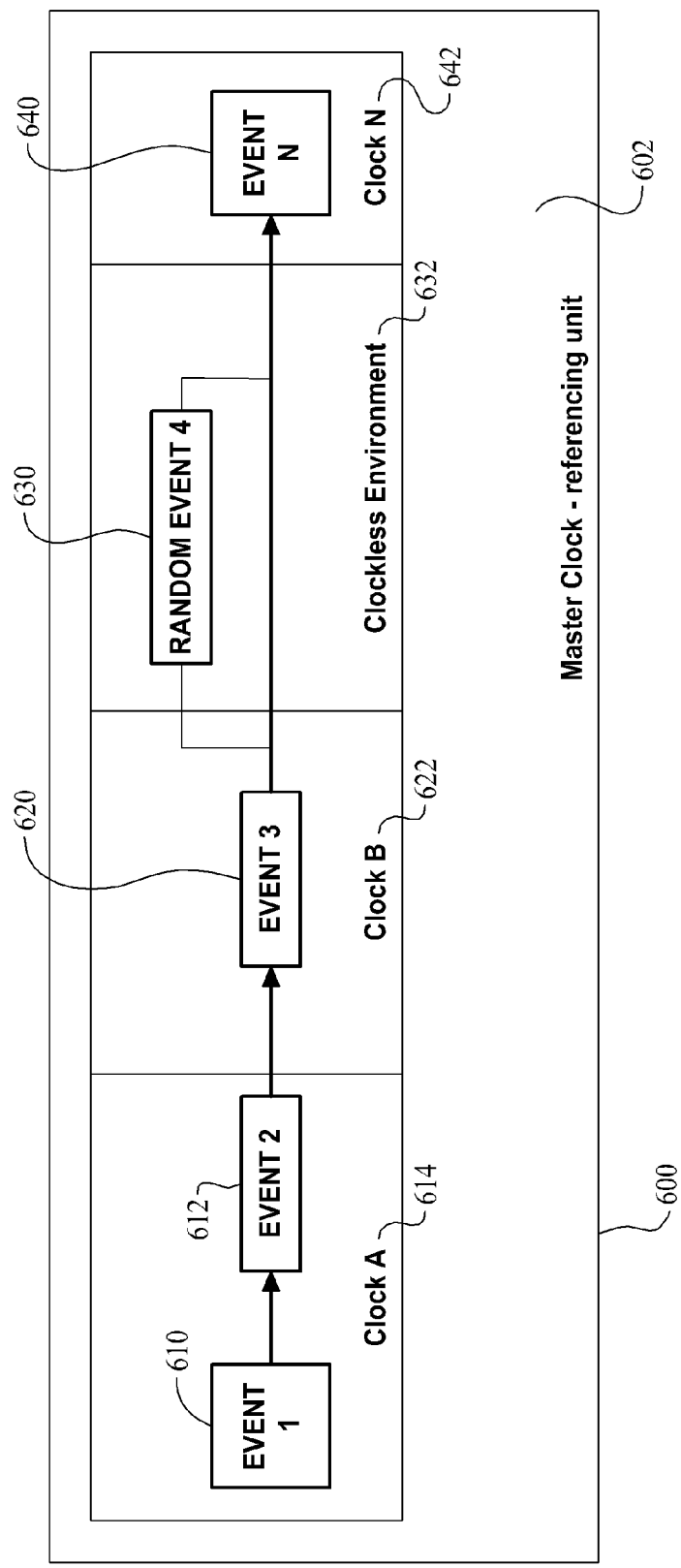
FIG. 6 is a diagram illustrating events that occur in disparate clocking environments and a master clock operable to provide a common timing reference for the occurring events.

FIG. 6 provides further clarification and is an event diagram 600 in which events that are occurring in separate time domains are all sensed by a master clock 602 within the referencing unit 434. In the timing diagram, Event 1 610 occurs and triggers event 2 612 both of which are referenced to clock A 614. Event 2 612 triggers event 3 620. Event 3 620 is referenced to Clock B 622. A random event 4 630 occurs within a clockless environment 632. The random event 630 may or may not be combined with event 3 620 as event 3 620 is propagated through the clockless environment 632. Event 3 620, with or without the random event 630, propagates through the clockless environment 632 to trigger event n 640 which occurs within an environment references to clock N 642. The master clock 602 operates to reconcile the four different clocking environments such that, for example, event N 640 can be referenced in time to event 1 610.

Generally, master clock 602 (e.g. referencing unit 434) is programmed and operable to monitor the traffic occurring on disparate data buses to determine when an event occurs, and provide a common time reference for the event occurrence across multiple time domains. Particularly, the referencing unit 434 is operable to provide these timing references to an external unit, such as a user computer, where the user can complete any analysis with regard to propagation delay and the like.

A system that incorporates referencing unit 434 provides a sensorless system for determining the occurrence of selected events in a clockless environment or across disparate clock environments to allow for processing and analysis of time-related information about selected events.

At least a first selected event transmitter is included in such a system that is operable to transmit information, where at least a portion of the information is related to the existence of said first selected event and one or more of the start of the first selected event, the end of the first selected event, the duration of the first selected event, the relationship of the first selected event to at least one other selected event, and any time delay associated with the first selected event.

Such a sensorless system also include the referencing unit 434 described herein. The referencing unit 434 includes a receiver for each bus within the system as well as a real time master clock. As described herein, the referencing unit 434 is operable to receive the information transmitted from the first selected event transmitter and correlate a time of occurrence for the first selected event based upon the transmitted data and other known relational timing information provided to the referencing unit 434 including information provided by at least one other selected event provided to the referencing unit 434.

The above described embodiments provide a system where the referencing unit 434 monitors the various communications buses of a platform to provide a single time reference for the various events that transpire across disparate busses on a platform. The embodiment therefore allows the thousands of parameters handled by the disparate on-board buses to be referenced to a single time reference which allows for processing and analysis of certain time related events as the event propagates through the platform. While described in terms of an aircraft avionics system, the embodiments should not be construed to be so limited as similar bus-based architectures are found in land vehicles, including automobiles as well as in sea vehicles. Other air vehicles, for example, missiles and space vehicles may also incorporate such a bus-based architecture.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for correlating, in time, selected events that are memorialized as data within messages transmitted across disparate communications busses, said method comprising:
   receiving, with a referencing unit, the messages that are transmitted across the disparate communications busses;
   referencing, with the referencing unit, the content of a first selected received message to a master clock within the referencing unit;
   referencing, with the referencing unit, the content of a second selected received message to the master clock within the referencing unit, the second selected received message related to the first selected message, the second selected received message occurring on a communications bus disparate from the communications bus upon which the first received message occurred; and
   providing, based on operation of the master clock, a common time reference for the content of both the first selected received message and the second selected received message.

2. The method according to claim 1 wherein receiving the messages that are transmitted across the disparate communications busses comprises coupling the referencing unit to each of the disparate communications busses of interest.

3. The method according to claim 1 wherein the messages that are transmitted across the disparate communications busses comprises messages transmitted between various line replaceable units of an aircraft across a plurality of disparate communications busses.

4. The method according to claim 3 wherein the messages comprise one or more of Mil-Std-1553 messages and ARINC-429 messages.

5. The method according to claim 1 further comprising forwarding the common time reference to an external device for analysis.

6. The method according to claim 1 wherein referencing comprises syncing instances of a parameter occurring in the first selected received message and the second selected received message to determine a true propagation delay across the disparate communications busses.

7. The method according to claim 1 wherein providing comprises operating a processing device to provide relevant timing of events that occur on the disparate communications busses to an external interface for transmission to at least one of an end user and an external computing device.

8. The method according to claim 1 wherein referencing comprises:
monitoring the first selected received message to determine when an event occurs; and
providing a common time reference for the event occurrence when the event occurrence appears in the second selected received message.

9. An avionics system comprising:
a plurality of line replaceable units;
at least two disparate busses communicatively coupling said plurality of line replaceable units; and
a referencing unit communicatively coupled to receive messages occurring on said at least two disparate busses, said referencing unit comprising a master clock and programmed to:
reference the content of a first selected received message occurring on a first of said disparate busses to said master clock within the referencing unit;
reference the content of a second selected received message to the master clock within the referencing unit, the second selected received message containing a parameter also contained within the first selected received message, the second selected received message occurring on a communications bus disparate from the communications bus upon which the first selected received message occurred; and
provide, based on operation of said master clock, a common time reference for occurrence of the parameter in both the first selected received message and the second selected received message.

10. The avionics unit according to claim 9 wherein said at least two disparate busses comprises one or both of Mil-Std-1553 busses and ARINC-429 busses.

11. The avionics unit according to claim 9 wherein said referencing unit comprises an external interface operable for forwarding the common time references for occurrence of the parameter to an external device.

12. The avionics unit according to claim 9 wherein said referencing unit is programmed to sync instances of a parameter occurring in the first selected received message and the second selected received message to determine a true propagation delay across said disparate communications busses.

13. The avionics unit according to claim 9 wherein said referencing unit comprises an external interface, said referencing unit programmed to provide data indicative of relevant timing of events that occur as indicated by data within the messages transmitted across said disparate communications busses to said external interface for transmission to at least one of an end user and an external computing device.

14. The avionics unit according to claim 13 wherein to provide data indicative of relevant timing of event occurrences, said referencing unit is programmed to:
monitor the first selected received message to determine when an event occurs; and
provide a common time reference for the event occurrence when the event occurrence appears in the second selected received message.

15. A referencing unit comprising:
a processing device;
a master clock coupled to said processing device; and
a plurality of receivers communicatively coupled to said processing device and said master clock, said receivers each operable for communicative coupling to a communications bus, said referencing unit programmed to:
reference the content of a first message received at a first of said receivers from a first communications bus to said master clock;
reference the content of a second message received at a second of said receivers from a second communications bus, disparate from the first communications bus, to said master clock, the second message containing a parameter also contained within the first message; and
generate a common time reference for occurrence of the parameter in both the first message and the second message.

16. The referencing unit according to claim 15 wherein said receivers are compatible with at least one of a Mil-Std-1553 bus and an ARINC-429 bus.

17. The referencing unit according to claim 15 wherein said referencing unit comprises an external interface communicatively coupled to said processing device operable for forwarding the common time reference for the parameter to an external device.

18. The referencing unit according to claim 15 wherein said processing device is programmed to sync instances of a parameter occurring in both the first message and the second message to determine a true propagation delay across the first and the second communications busses.

* * * * *